Patented Feb. 18, 1930

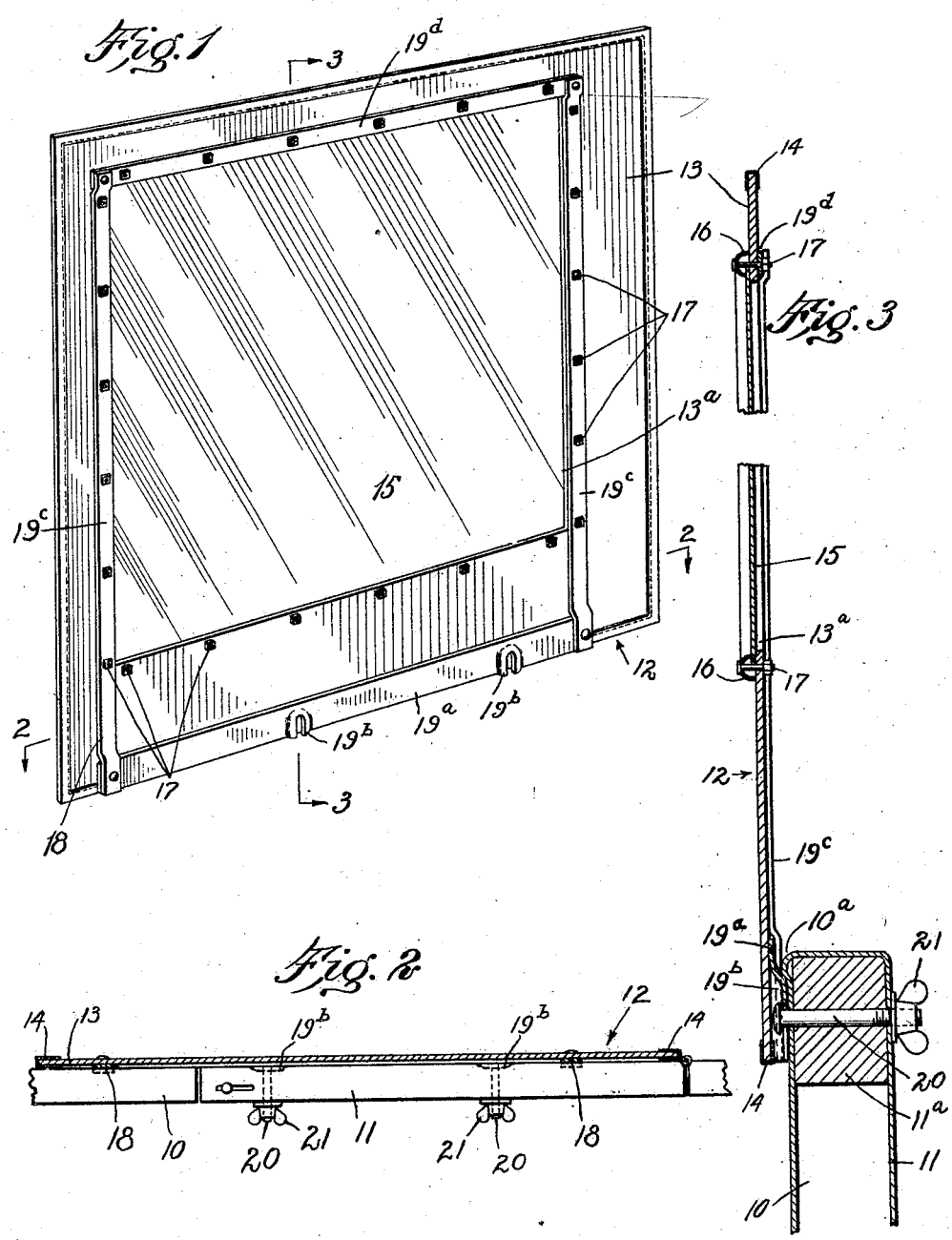

1,747,677

UNITED STATES PATENT OFFICE

EDWIN B. NATHAN, OF YONKERS, NEW YORK

WEATHER OR WINTER CLOSURE FOR AUTOMOBILES

Application filed August 1, 1925. Serial No. 47,468.

This invention relates to weather or winter closures for automobiles and more particularly is directed to an improvement in the construction of the side panels or sections which form part of the closure structure.

An object of the invention is the provision of an improved panel construction of the character described which may form a detachable weather or winter closure and which may quickly and easily be mounted in position on a standard touring car body to form a rigid structure.

Another object of the invention is to provide an improved panel or section construction for weather or winter automobile body closures comprising few and simple parts which are cheap to manufacture, neat in appearance, durable and practical and efficient to a high degree.

Other objects of this invention will in part be obvious and in part hereinafter pointed out.

Certain features herein shown and described are shown, described and claimed in my co-pending application Serial No. 28,307, filed May 6th, 1925.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a perspective view of a panel embodying the invention;

Fig. 2 is a fragmentary plan view of an automobile body and door provided with the panel, the latter shown in cross-section as cut on line 2—2 in Fig. 1;

Fig. 3 is a sectional view of an automobile body and having the panel mounted in position thereon the panel section being taken on line 3—3 in Fig. 1.

Referring in detail to the drawing, 10 indicates a fragmentary portion of an open automobile body having a side door 11 which may be provided with a collapsible or rigid top (not shown) of any well known construction.

For said body 10, a suitable detachable weather or winter closure may be provided which may include one or more side panels 12 embodying the invention.

The side panel 12 has a body portion 13 which is preferably made of fibre, wood, metal or other suitable stiff sheet material having finished surfaces designed to conform with the car decoration. When said body portion is made of fibre it may have its surfaces finished to simulate grained leather and if desired, may be provided with a binding 14 stitched or otherwise fastened about the edges thereof for reinforcing same and also for adding to the neatness of appearance. A suitably shaped opening 13$^a$ is provided in said body portion 13, and a window 15 of glass, celluloid or other transparent material is mounted over said opening by suitable means such as a frame 16 and bolts 17, the latter securing said frame and window to the body portion 13 as shown in Fig. 3. The frame 16 is preferably constructed to be sufficiently resilient to compensate for irregularities in the panel 12 on which said frame is bolted.

To secure the panel 12 to the car body or door 11, there is provided a stiffening frame member 18 having suitable detachable fastening means, as for example slotted socket portions 19$^b$ in the lower horizontally extending bar 19$^a$ of said frame member for engaging with the head of carriage bolt 20. Said bolts are preferably passed through the inner frame structure 11$^a$ of the body or door 11 below the ornamental beading 10$^a$ (see Fig. 3) and are provided with wing nuts 21 to facilitate the quick installation and detachment of the panel 12. The upright bars 19$^c$ and upper horizontally extending bar 19$^d$ are constructed to extend about the edge portion of the window opening 13$^a$, and together with the frame 16 serve as braces so that said panel forms a rigid structure of few and simple parts when assembled and mounted in position.

It will thus be seen that there is provided a device in which the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:—

1. In a winter or weather closure for an automobile touring body, a demountable panel comprising a body portion formed of stiff sheet material having an opening, a window covering for said opening, a frame for securing the window in place, having a portion contacting one side of said body portion and a portion contacting said window, a reinforcing member contacting only said body portion on the other side thereof and fastening means passing thru said frame, body and member, said reinforcing member being provided with a slotted socketed portion for detachably securing said panel to said automobile body.

2. In a winter or weather closure for an automobile touring body, a demountable panel comprising a body portion formed of sheet material having an opening, an imperforate covering for said opening having an edge portion overlapping an edge portion of said body at said opening, a frame for securing the window in place having a portion contacting said body portion on one side thereof and a portion contacting said window, a reinforcing member contacting only said body portion on the other side thereof, and fastening means passing thru said frame, body and member.

3. In a winter or weather closure for an automobile touring body, a demountable panel comprising a body portion formed of stiff sheet material having an opening, an imperforate covering for said opening having an edge portion overlapping an edge portion of said body at said opening, a frame for securing the window in place having a portion contacting said body portion on one side thereof and a portion contacting said window, a reinforcing member contacting said body portion on the other side thereof, and fastening means passing thru said frame, body and member, said reinforcing member being provided with a slotted socketed portion for detachably securing said panel to said automobile body.

In testimony whereof I affix my signature.

EDWIN B. NATHAN.